United States Patent
Yen et al.

(10) Patent No.: US 7,599,010 B2
(45) Date of Patent: Oct. 6, 2009

(54) TV RECEIVER AND ANALOG TV SIGNAL PROCESSING METHOD

(75) Inventors: Kuang-Yu Yen, Tai-Chung (TW); Liang-Hui Lee, Tai-Nan (TW); Jackie K. Cheng, Irvine, CA (US); Thomas Francis Baker, Los Angeles, CA (US); Kuangyu Li, Glendale, CA (US)

(73) Assignees: Realtek Semiconductor Corp., Hsinchu (TW); Orion Microelectronics Corporation, Irvine, CA (US)

( * ) Notice: Subject to any disclaimer, the term of this patent is extended or adjusted under 35 U.S.C. 154(b) by 559 days.

(21) Appl. No.: 10/908,275

(22) Filed: May 5, 2005

(65) Prior Publication Data

US 2005/0248689 A1    Nov. 10, 2005

Related U.S. Application Data

(60) Provisional application No. 60/521,490, filed on May 6, 2004.

(51) Int. Cl.
*H04N 5/50*     (2006.01)
*H03M 1/12*     (2006.01)

(52) U.S. Cl. ............... 348/731; 348/555; 348/572; 348/725

(58) Field of Classification Search ......... 348/725–726, 348/731, 678, 735–738, 554–556, 558, 424.1, 348/720; 375/345; 725/68, 100, 70, 131, 725/139, 151; *H04N 5/50*; *H03M 1/12*
See application file for complete search history.

(56) References Cited

U.S. PATENT DOCUMENTS

| | | | |
|---|---|---|---|
| 5,548,344 A * | 8/1996 | Park ............................. | 348/726 |
| 5,825,242 A * | 10/1998 | Prodan et al. ................. | 329/304 |
| 6,005,640 A * | 12/1999 | Strolle et al. ................. | 348/726 |
| 6,678,011 B2 * | 1/2004 | Yanagi et al. ................. | 348/725 |
| 7,202,910 B1 * | 4/2007 | Grubbs et al. ................ | 348/555 |
| 7,239,357 B2 * | 7/2007 | Jaffe ............................. | 348/726 |
| 2005/0212977 A1 * | 9/2005 | Zhu et al. ..................... | 348/725 |

* cited by examiner

*Primary Examiner*—Trang U Tran
(74) *Attorney, Agent, or Firm*—Thomas, Kayden, Horstemeyer & Risley

(57) ABSTRACT

The present invention provides a TV receiver and an analog TV signal processing method. The TV receiver includes a tuner, an analog-to-digital converter, and a digital filter module. The tuner is utilized to receive an RF signal and generate a first signal; the analog-to-digital converter is coupled to the tuner for converting the first signal to a digital signal, and the digital filter module is coupled to the analog-to-digital converter for filtering the digital signal in order to filter an analog TV signal contained in the RF signal in digital domain.

20 Claims, 8 Drawing Sheets

TV RECEIVER AND ANALOG TV SIGNAL PROCESSING METHOD

CROSS REFERENCE TO RELATED APPLICATIONS

This application claims the benefit of U.S. Provisional Application No. 60/521,490, filed on May 6, 2004 and entitled "Implement IF SAW for Analog TV in Digital Domain", the contents of which are incorporated herein by reference.

BACKGROUND OF INVENTION

1. Field of the Invention

The present invention relates to an apparatus and method for receiving TV signals, especially to a TV receiver and an analog signal processing method for implementing intermediate frequency filtering of an analog TV signal in the digital domain.

2. Description of the Prior Art

A SAW filter is a frequency-selective device that is made by utilizing surface acoustic wave (SAW) effect and harmonic oscillation. It is well known in the industry that a SAW filter is a frequency-selective device, which passes signals of a certain range of frequencies and filters out signals of other frequencies. A SAW filter has advantages such as small size (only 1/40 of a ceramic dielectric filter), light-weighted (only 1/30 of a ceramic dielectric filter), and good frequency selectivity. Due to these advantages, the SAW filter is broadly utilized in certain fields such as those of communication systems, broadcasting, and TV.

Generally, a traditional TV receives analog channels, but recently a digital channel TV system that broadcasts better-quality digital TV programs has been introduced. When dealing with analog TV channels and digital TV channels, analog TV signals and digital TV signals are processed separately and respectively because analog and digital signals are essentially different in characteristics. Before digital TVs can completely substitute analog TVs, the present TV products must be able to receive and process analog TV signals transmitted through analog channels as well as digital TV signals transmitted through digital channels. Therefore, a receiver contained in a TV must have two separate demodulators, one for digital TV signals and the other for traditional analog TV signals.

Please refer to FIG. 1, which shows a typical TV receiver 100. The TV receiver 100 receives both analog and digital TV signals. After processed by a tuner 110, a radio frequency signal RF is transformed into an intermediate frequency (IF) signal IF, which is further processed by a SAW filter to suppress adjacent channel interference and perform channel selection. However, because of the significant difference between the characteristics of an analog TV channel and a digital TV channel, the TV receiver 100 generally contains two filters: an analog TV intermediate frequency SAW filter 122 and a digital TV intermediate frequency SAW filter 124, for respective SAW filtering operations. Please refer to FIG. 2, which shows a frequency response of the analog TV intermediate frequency SAW filter 122 and the digital TV intermediate frequency SAW filter 124 of FIG. 1. The solid line represents the frequency response of the digital TV intermediate frequency SAW filter 124, and the dotted line represents the frequency response of the analog TV intermediate frequency SAW filter 122. Obviously, these two frequency responses are not quite the same. At frequency $f_1$ the analog TV intermediate frequency SAW filter 122 shows an audio carrier suppression, and between frequencies $f_2$ and $f_3$ the frequency response of the analog TV intermediate frequency SAW filter 122 corresponds to a Nyquist slope.

In the TV receiver 100, analog TV channels and digital TV channels must be separated into two paths for further video and audio processes. The intermediate frequency IF is transmitted to the analog TV intermediate frequency SAW filter 122 to generate an analog TV input signal $S_a$ and to the digital TV intermediate frequency SAW filter 124 to generate a digital TV input signal $S_d$. However, because SAW filters are rather expensive, the TV receiver 100 becomes extremely costly.

SUMMARY OF INVENTION

Therefore, it is an objective of the claimed invention to provide a TV receiver and an analog signal processing method for implementing intermediate frequency filtering of an analog TV in the digital domain. By utilizing the method and the receiver a SAW filter can be removed so that the cost of the TV receiver is decreased.

According to embodiments of the present invention, a TV receiver is disclosed. The TV receiver comprises a tuner, for receiving an RF signal to generate a first signal; an analog-to-digital converter, coupled to the tuner, for converting the first signal into a digital signal; and a digital filter module, coupled to the analog-to-digital converter, for filtering the digital signal, so as to filter an analog TV signal comprised in the RF signal in digital domain.

According to embodiments of the present invention, a TV receiver is also disclosed. The TV receiver comprises an analog-to-digital converter for converting a first signal into a digital signal; and a digital filter module, coupled to the analog-to-digital converter, for filtering the digital signal, so as to filter an analog TV signal comprised in the first signal in digital domain; and a digital-to-analog converter, coupled to the digital filter module, for converting the filtered digital signal into a second signal.

According to embodiments of the present invention, a method for processing an analog TV signal is further disclosed. The method comprises receiving a first signal comprising an analog TV signal; performing analog-to-digital conversion on the first signal, to generate a digital signal; and filtering the digital signal, so as to filter the analog TV signal comprised in the first signal in digital domain, and then generate a filtered signal.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
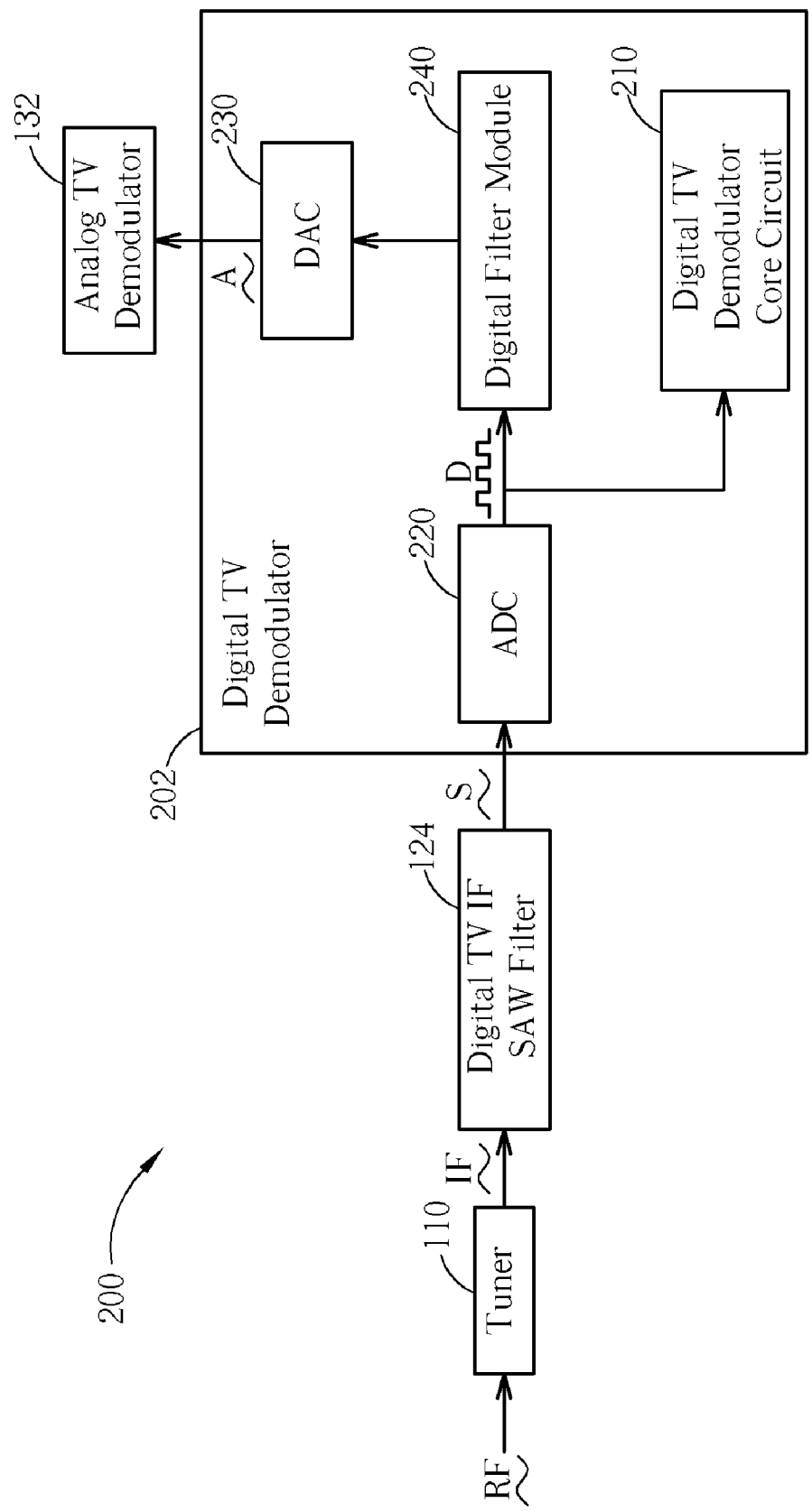
FIG. 3 is a block diagram of a TV receiver according to an exemplary embodiment of the present invention.

Please refer to FIG. 3, which shows an embodiment of a TV receiver 200 according to the present invention. In this embodiment, the TV receiver 200 contains a tuner 110, a digital TV IF SAW filter 124, a digital TV demodulator 202, and an analog TV demodulator 132. The digital TV demodulator 202 contains an analog-to-digital converter (ADC) 220, a digital filter module 240, a digital-to-analog converter 230, and a digital TV demodulation core circuit 210.

During processing of the digital signal, after the TV receiver 200 receives a radio frequency signal RF, the radio frequency signal RF is processed by the tuner 110 and therefore an intermediate frequency signal IF is generated. To achieve channel selection, the digital TV IF SAW filter 124 filters the intermediate frequency signal IF to perform an out-of-band interference suppression on the corresponding digital TV channels. The filtered intermediate frequency signal IF, i.e., the input signal S shown in FIG. 3, is converted to a corresponding digital signal D by the ADC 220 of the digital TV demodulator 202. The digital signal D is then sent to the digital TV demodulation core circuit 210 to be further demodulated. The demodulation process of the digital TV demodulation core circuit 210 is well known by those skilled in the art and is not described herein.

Figure 1:
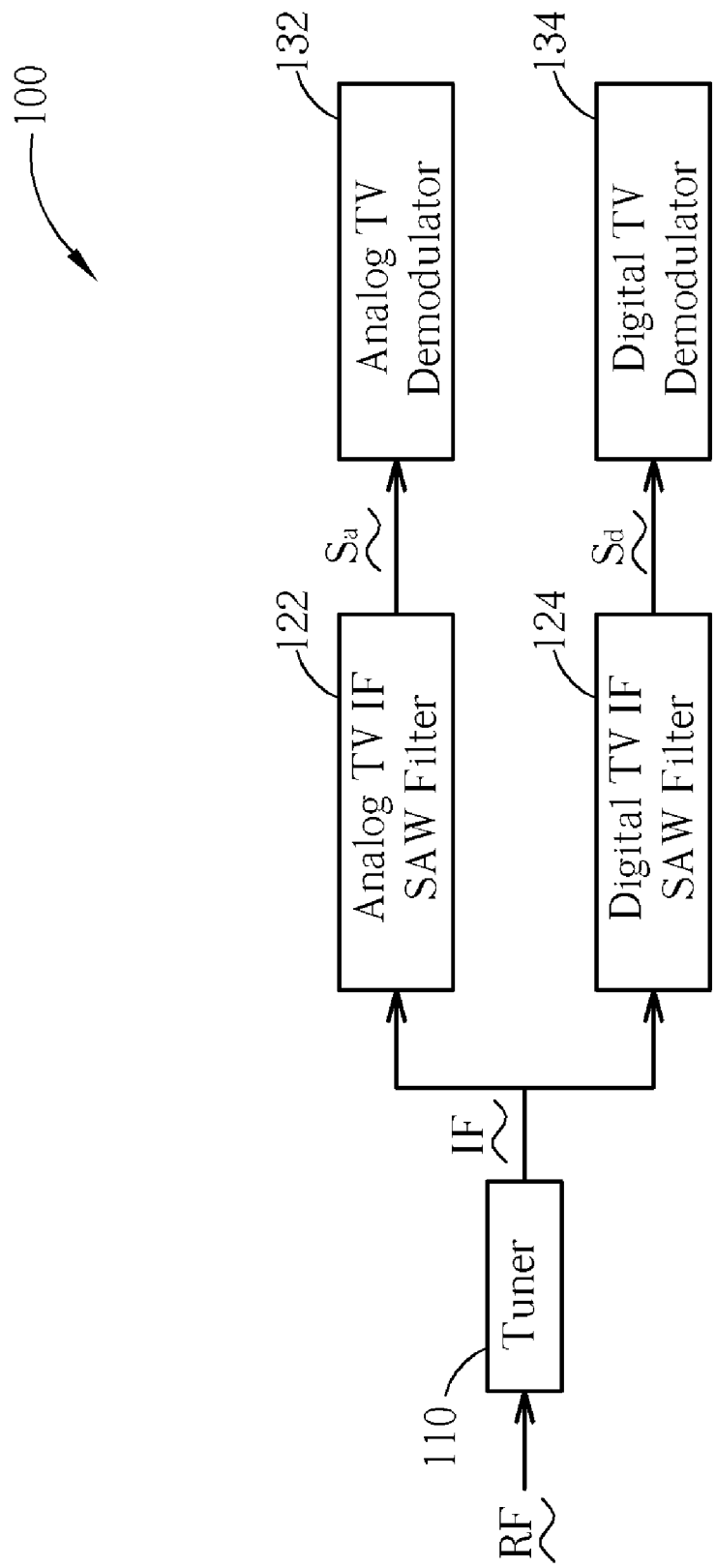
FIG. 1 is a block diagram of a TV receiver.
Figure 2:
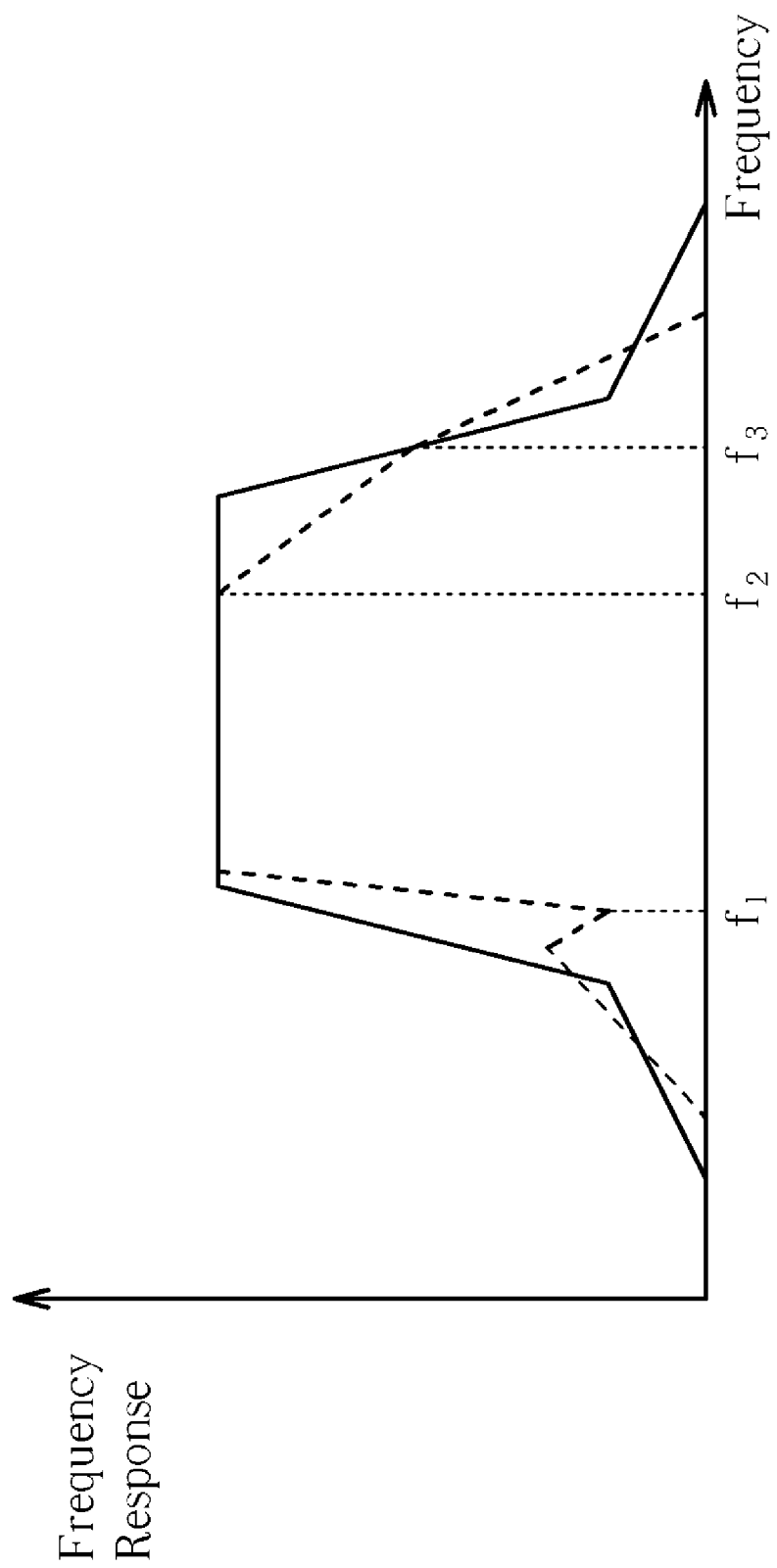
FIG. 2 is a frequency response of an analog TV intermediate frequency SAW filter and a digital TV intermediate frequency SAW filter shown in FIG. 1.

During the processing of the analog signal, similarly, after the TV receiver 200 receives a radio frequency signal RF, the radio frequency signal RF is processed by the tuner 110 and the digital TV IF SAW filter 124, and then the ADC 220 converts the intermediate frequency signal IF to the corresponding digital signal D. In this embodiment, the TV receiver 200 utilizes the digital filter module 240 of the digital TV demodulator 202 to implement the process of filtering the intermediate frequency of analog TV channels. The aforementioned filtering process is done in the digital domain in which the analog TV signals are converted to corresponding digital TV signals to be filtered. The TV receiver 200 filters the received analog TV signals according to the dotted-line frequency response shown in FIG. 2 that possess characteristics of Nyquist slope, audio carrier suppression, and out-of-band interference suppression. Because the received signal is processed to suppress out-of-band interference when passing through the digital TV IF SAW filter 124, the other two filtering characteristics may then be performed in the digital domain. In this embodiment, such two filtering characteristics are achieved by utilizing the digital filter module 240. It is well known by those skilled in the art that an analog TV channel is composed mainly of two parts: the video signal and the audio signal; therefore, the digital filter module 240 processes the video signal and the audio signal separately.

Figure 4:
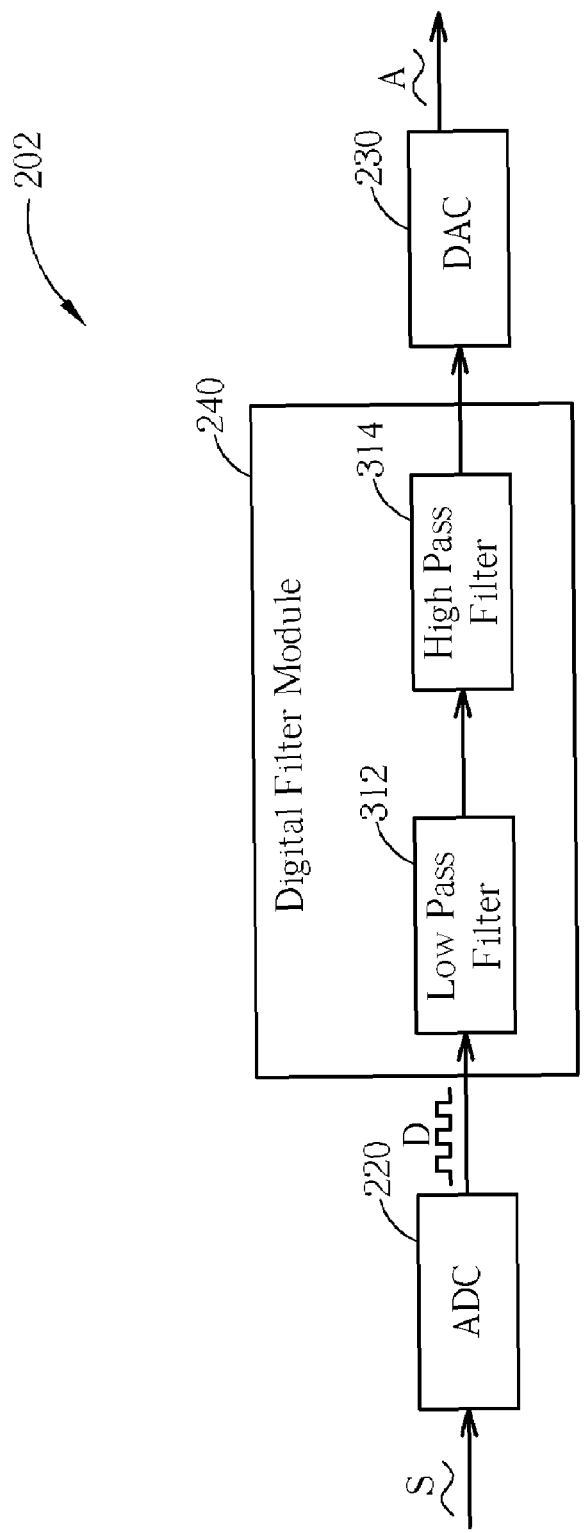
FIG. 4 is a block diagram of a digital TV demodulator shown in FIG. 3 according to a first embodiment of the present invention.

Firstly, the procedure of video signal processing performed by the digital filter module 240 is described as follows. Referring to FIG. 4 illustrating an exemplary embodiment of the digital TV demodulator 202 shown in FIG. 3, the digital filter module 240 comprises a low pass filter 312 and a high pass filter 314. Please note, that the relative allocation of the low pass filter 312 and the high pass filter 314 is not limited to this embodiment, i.e., the order is interchangeable. The low pass filter 312 is utilized to implement the Nyquist slope characteristic shown in FIG. 2, filtering the digital signal D to process the video component of the analog TV channel. The high pass filter 314 is utilized to implement the audio carrier suppression on the analog TV channel to filter out the audio interference on the video signal. The low pass filter 312 can be a raised cosine filter to implement the Nyquist slope.

Figure 5:
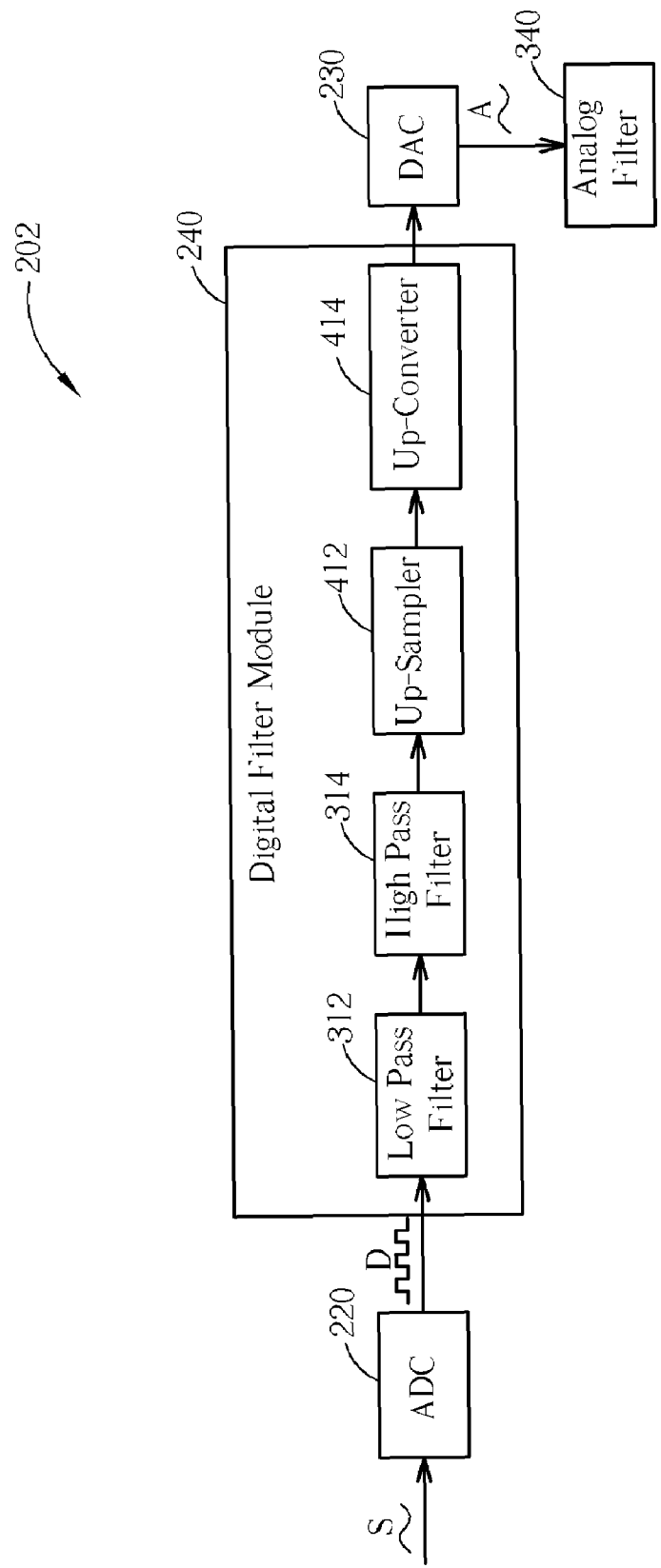
FIG. 5 is a block diagram of a digital TV demodulator shown in FIG. 3 according to a second embodiment of the present invention.

Moreover, the input signal S of the ADC 220 could be a low intermediate frequency (low IF) signal (e.g., 4 MHz) or an intermediate frequency (IF) signal (e.g., 36 MHz or 44 MHz), and the input signal S is converted into a digital signal D of a 4~6 MHz low IF by the ADC 220. If it is desired that the output signal of the digital filter module 240 is in the IF range of 36 MHz or 44 MHz, the frequency of the digital signal D needs to be raised to the IF range before it is processed by the DAC 230. Referring to FIG. 5, illustrating a second exemplary embodiment of the digital TV demodulator 202 shown in FIG. 3, the digital filter module 240 further comprises an up-sampler 412 and an up-converter 414 for raising the frequency of the digital signal D. The up-sampler 412 and the up-converter 414 are connected in series. Assuming that the ADC 220 utilizes a first sample frequency to convert the input signal S into the digital signal D, then the up-sampler 412 would utilize a second sample frequency higher than the first sample frequency to sample the digital signal D after it is processed by the high pass filter 314. An up-sampling signal is generated by the up-sampler 412, and then the up-converter 414 raises the frequency of the up-sampling signal to a desired frequency band according to a carrier frequency. The detailed description of functions of the up-sampler 412 and the up-converter 414 is omitted because these two elements are well known by those skilled in the art. In addition, in this embodiment the digital TV demodulator 202 further comprises an analog filter 340, which can be a band-pass filter or a low-pass filter. The analog filter 340 is set mainly for filtering out the image signal generated during the operation of the up-converter 414; therefore, the video signal outputted by the DAC 230 is not affected by such image signal.

Figure 6:
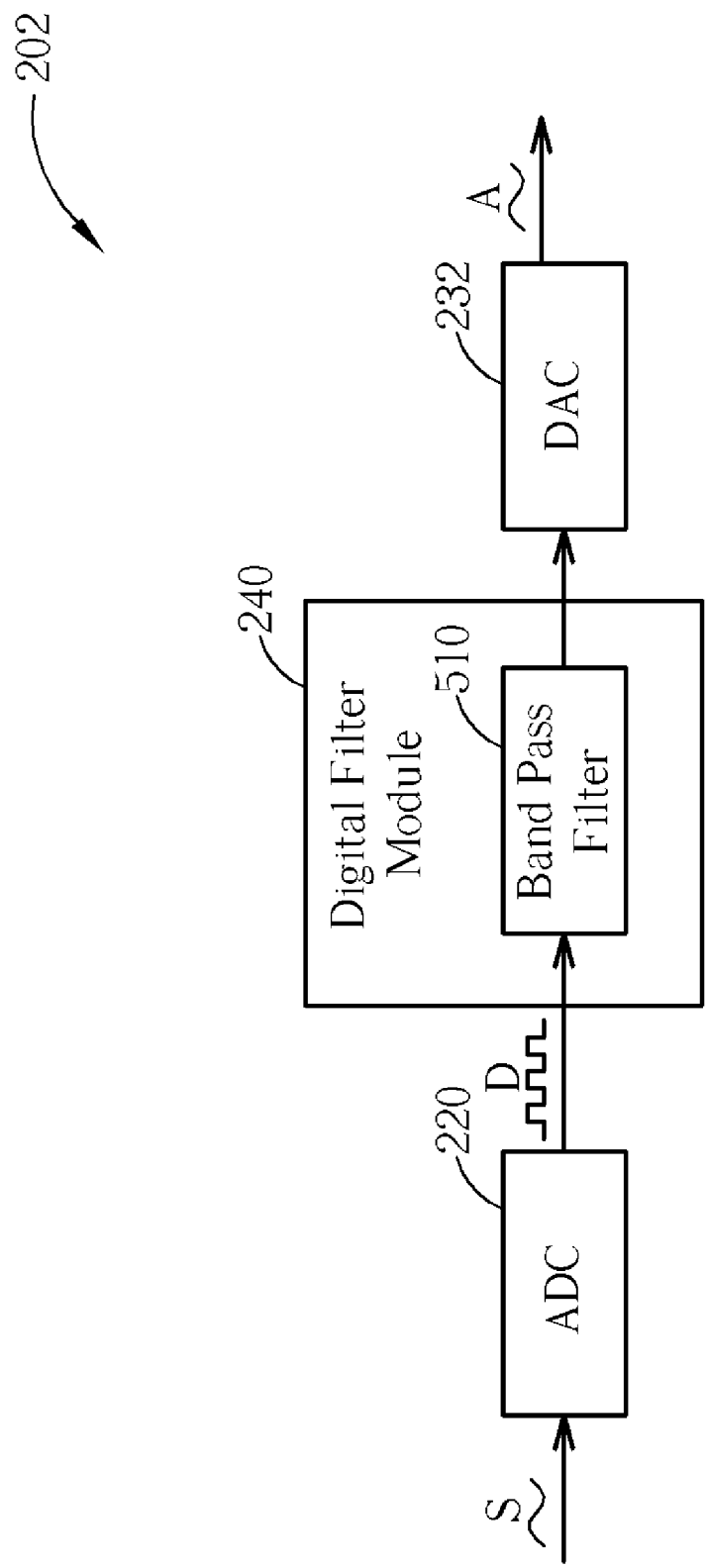
FIG. 6 is a block diagram of a digital TV demodulator shown in FIG. 3 according to a third embodiment of the present invention.

Secondly, the procedure of audio signal processing made by the digital filter module 240 is described as follows. Referring to FIG. 6, illustrating a third exemplary embodiment of the digital TV demodulator 202 shown in FIG. 3, the digital filter module 240 comprises a band-pass filter 510 for processing audio signals. After processed by the band-pass filter 510, audio signals are further processed through similar procedures (i.e., converted into an analog signal A by a DAC 232 and then transmitted to the analog TV demodulator 132) of the video signals as shown in FIG. 4.

Figure 7:
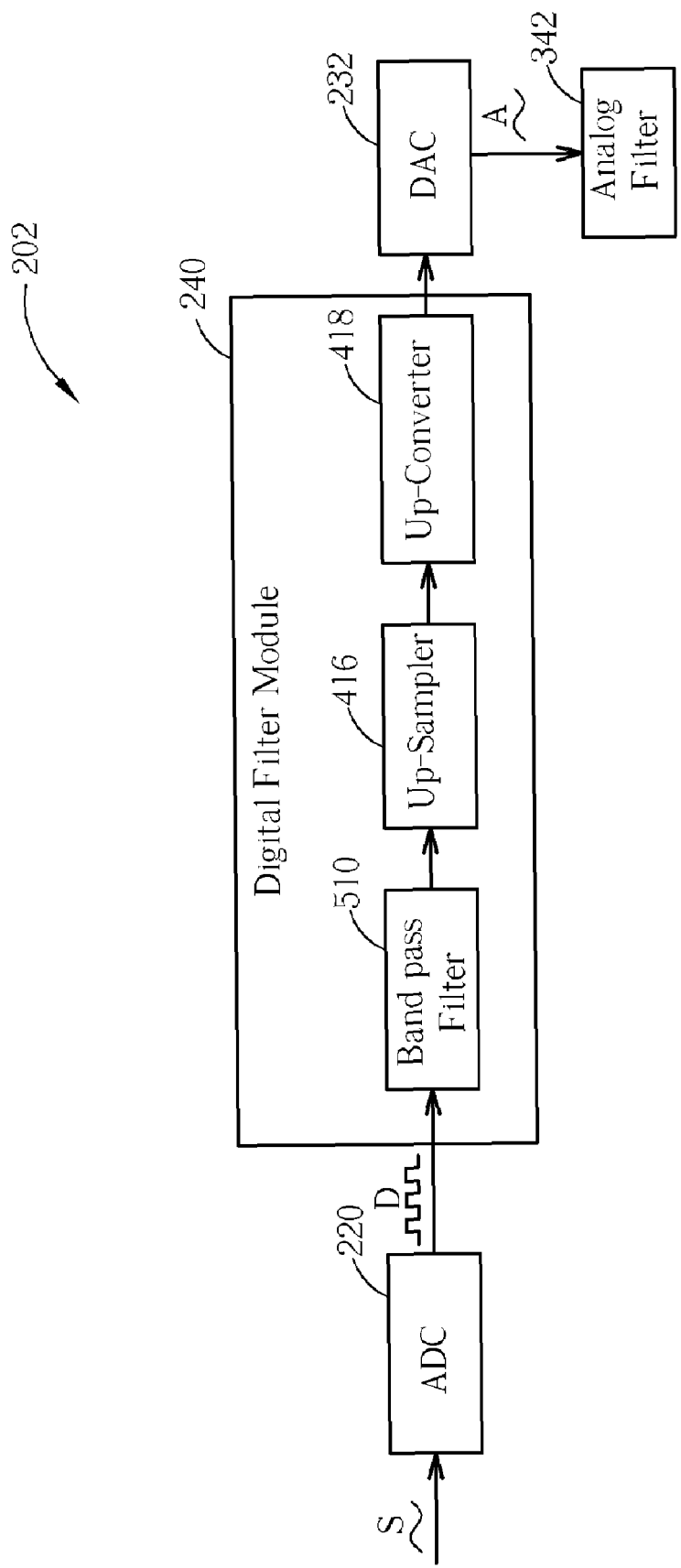
FIG. 7 is a block diagram of a digital TV demodulator shown in FIG. 3 according to a fourth embodiment of the present invention.

Similarly, the frequency of the audio signal after it is processed by the ADC 220 is about 4~6 MHz which is within the range of low IF. In some circumstances, if it is desired that the frequency of the audio signal, after it is processed by the ADC 220, is in the IF band (36 MHz or 44 MHz), then frequency of the audio signal needs, like aforementioned procedures of the video signal, to be raised to the IF band before being sampled by the DAC 232. Referring to FIG. 7, illustrating a fourth exemplary embodiment of the digital TV demodulator 202 shown in FIG. 3, the digital filter module 240 further comprises an up-sampler 416 and an up-converter 418 for raising the frequency of the signal outputted by the band-pass filter 510 to the IF band. Similarly, the digital TV demodulator 202 further comprises an analog filter 342 (e.g., a band-pass filter or a low-pass filter), which filters out the image signal generated by the up-converter 414 during the up-converting process. The desired audio signal outputted by the DAC 230 is then not affected by the image signal.

In summary, in analog TV channels, the video signal or the audio signal can be converted into digital formats and then processed by the digital filter module 240 to achieve IF signal filtering on analog TV signals. In addition, the digital filter module 240 can further comprise the low pass filter 312 and the high pass filter 314 shown in FIG. 4 or FIG. 5, and the band-pass filter 510 shown in FIG. 6 or FIG. 7 such that video signals and the audio signals can be processed at the same time.

Figure 8:
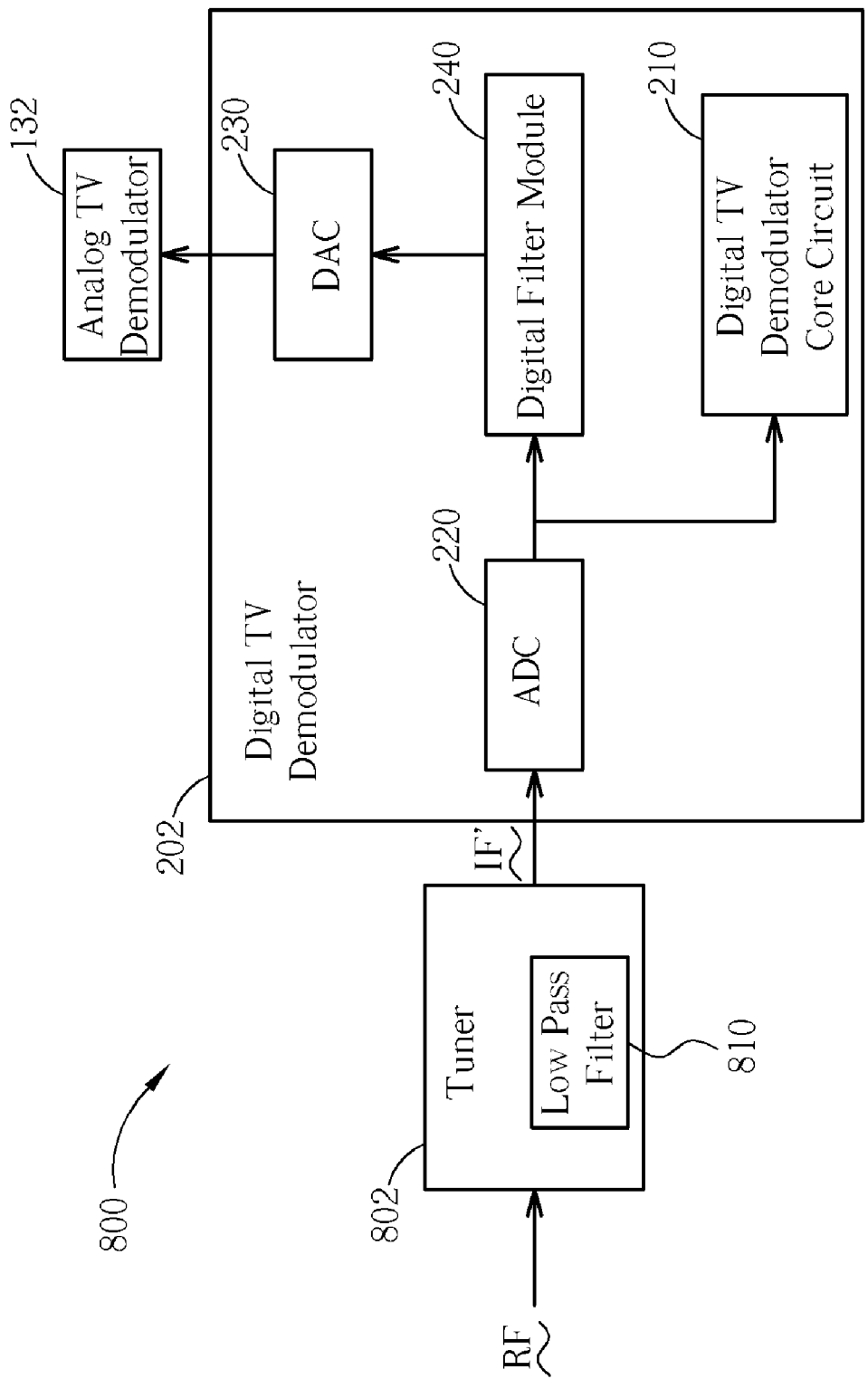
FIG. 8 is a block diagram of a TV receiver according to another exemplary embodiment of the present invention.

Referring to FIG. 8, illustrating the block diagram of a TV receiver 800 according to another exemplary embodiment of the present invention, the components and the layout of the TV receiver 800 are similar to those of the TV receiver 200 shown in FIG. 3. The main difference is the mechanism to implement the out-of-band interference suppression. The TV receiver 200 utilizes the digital TV intermediate frequency SAW filter 124 to perform the out-of-band interference suppression; however, in this embodiment the TV receiver 800 utilizes a tuner 802 to directly down-convert the RF signal into a low IF signal IF' (e.g., 4 MHz). In this situation, the digital TV intermediate frequency SAW filter 124 shown in FIG. 3 can then be replaced by a built-in low pass filter 810 contained in the tuner 802. The cut-off frequency of the low pass filter 810 can be set as an exemplary frequency of 8 MHz. Similarly, the digital filter module 240 can process video signals by utilizing the structure shown in FIG. 4 or FIG. 5 or process audio signals by utilizing the structure shown in FIG. 6 or FIG. 7 or both. In summary, by following this embodiment, the digital TV intermediate frequency SAW filter 124 can be further omitted to reduce cost of the TV receiver.

The aforementioned TV receivers and methods for receiving TV signals implement IF filtering on analog signals in digital domain such that the analog TV intermediate frequency SAW filter can be omitted to reduce the cost of the TV receiver. Besides, if the tuner of the TV receiver down-converts an RF signal into a low IF signal, a low pass filter can be set in the tuner to replace the digital TV intermediate frequency SAW filter to further reduce the cost of the TV receiver.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A TV receiver comprising:
   a tuner, for receiving an RF signal to generate a first signal;
   an analog-to-digital converter, coupled to the tuner, for converting the first signal into a digital signal;
   a digital filter module, coupled to the analog-to-digital converter, for filtering the digital signal to filter an analog TV signal comprised in the RF signal in digital domain and processing an audio carrier suppression for the analog TV signal in digital domain;
   a digital-to-analog converter, coupled to the digital filter module, for converting the filtered digital signal into a second signal;
   an analog TV demodulator, coupled to the digital-to-analog converter, for performing analog TV demodulation upon the second signal so as to demodulate the analog TV signal contained in the RF signal; and
   a digital TV demodulator, coupled to the analog-to-digital converter, for performing digital TV demodulation upon the digital signal so as to demodulate a digital TV signal contained in the RF signal.

2. The TV receiver of claim 1, wherein the tuner further comprises a digital TV signal intermediate frequency filter for performing digital TV filtering upon the first signal to filter an intermediate frequency of the first signal.

3. The TV receiver of claim 2, wherein the digital TV signal intermediate frequency filter comprises a surface acoustic wave (SAW) filter.

4. The TV receiver of claim 2, wherein the digital TV signal intermediate frequency filter comprises a low pass filter.

5. The TV receiver of claim 1, wherein the digital filter module has a characteristic of a Nyquist slope.

6. The TV receiver of claim 1, wherein the digital filter module comprises:
   a low pass filter for implementing a characteristic of a Nyquist slope; and
   a high pass filter for processing the audio carrier suppression.

7. The TV receiver of claim 6, wherein the low pass filter comprises a raised cosine filter.

8. The TV receiver of claim 1, wherein the digital filter module comprises a band pass filter for processing audio signals.

9. The TV receiver of claim 1, wherein the digital filter module comprises:
   an upsampler for upsampling the filtered signal; and
   an upconverter, coupled to the upsampler, for raising the frequency of the filtered signal.

10. The TV receiver of claim 9, wherein the digital TV demodulator comprises an analog filter for filtering out an image signal generated during operation of the upconverter.

11. A method for processing an analog TV signal comprising:
   tuning an RF signal to generate a first signal comprising an analog TV signal;
   performing analog-to-digital conversion on the first signal, to generate a digital signal;
   filtering the digital signal to filter the analog TV signal comprised in the first signal in digital domain and processing an audio carrier suppression for the analog TV signal in digital domain, and then generate a filtered signal;
   performing digital-to-analog conversion on the filtered signal, to generate a second signal;
   performing analog TV demodulation upon the second signal so as to demodulate the analog TV signal;
   performing digital TV demodulation upon the digital signal outputted by the analog-to-digital conversion, so as to demodulate a digital TV signal comprised in the first signal.

12. The method of claim 11, further comprising performing digital TV filtering upon the first signal to filter an intermediate frequency of the first signal.

13. The method of claim 12, wherein the intermediate frequency filtering is performed by a surface acoustic wave (SAW) filter.

14. The method of claim 12, wherein the intermediate frequency filtering is performed by a low pass filter.

15. The method of claim 11, wherein the filtered signal has a characteristic of a Nyquist slope.

16. The method of claim 11, wherein the digital signal is filtered by a low pass filter implementing a characteristic of a Nyquist slope, and wherein the audio carrier suppression is processed by a high pass filter.

17. The method of claim 16, wherein the low pass filter comprises a raised cosine filter.

18. The method of claim 11, wherein the digital signal is filtered by a band pass filter for processing audio signals.

19. The method of claim 11, further comprising:
   upsampling the filtered signal; and
   raising the frequency of the upsampled signal.

20. The method of claim 19, further comprising filtering out an image signal in the raised frequency signal.

* * * * *